United States Patent [19]
Borschel et al.

[11] Patent Number: 5,432,796
[45] Date of Patent: Jul. 11, 1995

[54] LINE MONITORING FOR SDH SIGNALS

[75] Inventors: Hartmut Borschel, Stuttgart; Gerhard Elze, Gerlingen; Klaus-Peter Gbur, Waiblingen, all of Germany

[73] Assignee: Alcatel N. V., Amsterdam, Netherlands

[21] Appl. No.: 191,362

[22] Filed: Feb. 3, 1994

Related U.S. Application Data

[63] Continuation of Ser. No. 850,556, Mar. 13, 1992, abandoned.

[30] Foreign Application Priority Data

Mar. 14, 1991 [DE] Germany ............ 41 08 230.3

[51] Int. Cl.⁶ ................................ G06F 11/00
[52] U.S. Cl. ........................ 371/25.1; 371/20.4; 371/5.1
[58] Field of Search ........................ 371/25.1

[56] References Cited

U.S. PATENT DOCUMENTS

| | | | |
|---|---|---|---|
| 5,095,482 | 3/1992 | Grallert | 371/3 |
| 5,151,902 | 9/1992 | Grallert | 371/5.1 |
| 5,177,742 | 1/1993 | Herzberger | 371/37.1 |

FOREIGN PATENT DOCUMENTS

| | | |
|---|---|---|
| 0166274 | 1/1986 | European Pat. Off. . |
| 0279452 | 8/1988 | European Pat. Off. . |
| 0388495 | 9/1990 | European Pat. Off. . |

OTHER PUBLICATIONS

*Evolution of ISDN Towards Broadband* ISDN by Rainer Handel, IEEE Network, Jan. 1989, pp. 7–13.
Commutation Et Transmission Bd. 11, Nr. 2, Feb. 1989, Paris Fr Seiten 85–96. J. M. Beaufils et al. "Nouvelle Generation de Multiplexeurs Numeriques de 2 A 140 Mbits/s".
Patent Abstracts Of Japan, vol. 0]], No. 073 (E–486) 5. Mar. 1987 & JP-A-61 230 451 (NEC Corp.) *Zusammenfassug*.
IEEE/IECE Global Telecommunications conference 1987; 15.–18. Nov. 1987; Tokyo, JP; Band 2; Seiten 895–902; A. Miles "Digital Performance Monitoring System".
Telecom Report. Bd. 12, Nr. 6, Nov. 1989, Munchen de Seiten 200–203–D. Seidel "Hohere Ubertaragungsqualitat durch leistungsfahige Uberwachung".

*Primary Examiner*—Vincent P. Canney
*Attorney, Agent, or Firm*—Ware, Fressola, Van Der Sluys & Adolphson

[57] ABSTRACT

Regenerator sections in known regenerators, which comply with CCITT-Recommendation G.958, are supervised by monitoring the transmission error probability of SDH (synchronous digital hierarchy) signals, through determination of the parity. This requires the breakdown and restoration of the SDH signal. This requires special signal processing installations, not required for regenerating transmission signals, such as multiplexer and demultiplexer, which cause considerable loss of output. The regenerator (RE) according to the invention determines the transmission error probability by comparing a known word in the head part of an STM-N signal with a reference word. The transmission error probability is derived from the result of the comparison, and transmitted to a central unit via an error line (FL). For example, to transmit the transmission error probability in an STM-N signal, the service channel of a regenerator that complies with CCITT-Recommendation G.958 may be used.

17 Claims, 3 Drawing Sheets

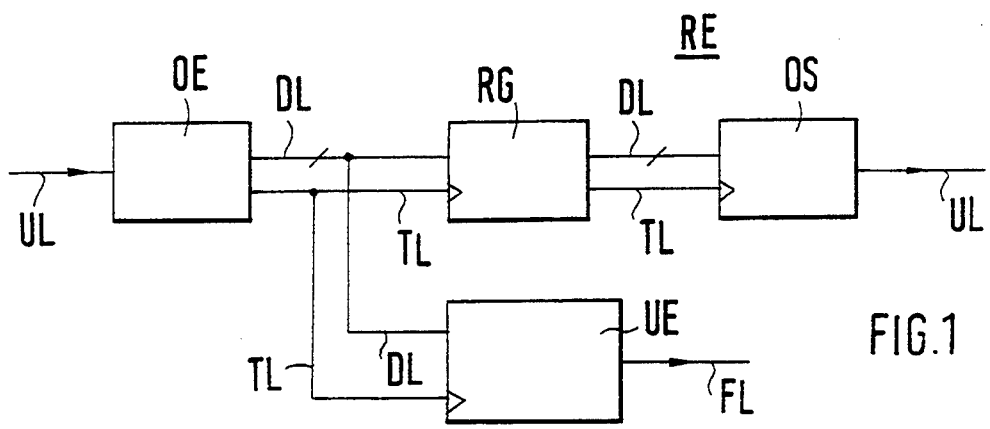
FIG.1
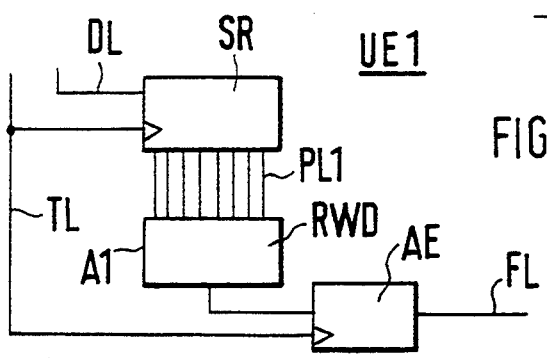
FIG.2
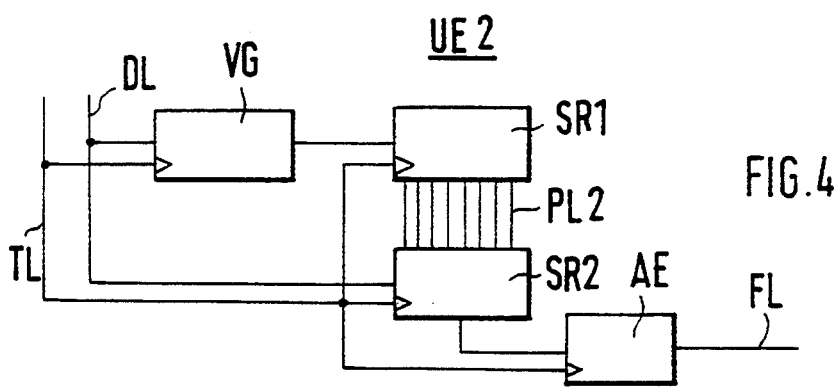
FIG.3
FIG.4

LINE MONITORING FOR SDH SIGNALS

This is a continuation of application Ser. No. 07/850,556 filed on Mar. 13, 1992, now abandoned.

TECHNICAL FIELD

The invention concerns a process and device for determining transmission errors in a multiplex signal, structured according to CCITT Recommendations G.707, G.708 and G.709, in which a multiplex frame with a head part and a functional part are described.

BACKGROUND OF THE INVENTION

The essential characteristics of the new Synchronous Digital Hierarchy (SDH) are set forth in CCITT-Recommendations G.707, G.708 and G.709. As with asynchronous hierarchies, the new synchronous hierarchy also contains multiplex signals with different bit rate frequencies. However, the multiplex signals of the synchronous digital hierarchy have other bit rate frequencies, and a different frame structure as well.

The elemental multiplex signal of the synchronous digital hierarchy is characterized as an STM-1 signal (synchronous transport module) and has a bit rate frequency of 155 kbit/s. Other multiplex signals can be formed by byte interleaving several STM-1 signals. These multiplex signals are called STM-N signals, where N indicates the number of STM-1 signals. The frame structure of the multiplex elements is byte oriented. One byte consists of eight bits. The frame of the STM-1 signal consists of nine lines and 270 columns for each one byte. The transmission sequence is by bytes and lines from top to bottom. The first nine columns contain the Section Overhead (SOH)—hereafter called head part. The remaining columns of the STM-1 signal contain the Payload—hereafter called functional part. No further details are provided, since the functional part's structure is not essential to understand the invention.

The head part contains signals assigned to a transmission line, such as the frame identification word, which consists of 6 bytes, the synchronization bytes A1, A2, byte B1, which serves to monitor a regeneration section, byte F1, which is transmitted by the service channel, or bytes for national use. To monitor a regeneration section, the CCITT-Recommendations G.783 and G.958 require measuring the transmission error probability, and to form the parity of the bits from an entire frame, and then transmit these in the following frame with the parity word B1. The parity word B1 is then checked and newly formed by each intermediate generator.

A well known process, the Bit Interleaved Parity (BIP) process, is used to determine the transmission error probability. It produces an N-bit code, where N is a whole number (integer), which is eight in the parity word B1.

This requires an intermediate generator, which complies with CCITT-Recommendation G.783 and G.958, needing an extensive circuit to determine the parity, and a device to evaluate and describe the parity word B1, in addition to a synchronization circuit, and other signal processing installations, such as a demultiplexer and a multiplexer.

The invention now has the task of creating a process and a device to realize it, making it possible, with simple means, to determine the transmission error probability during the transmission of SDH signals.

SUMMARY OF THE INVENTION

The present invention is a process to determine transmission errors in a multiplex signal, structured according to CCITT Recommendations G.707, G.708 and G.709, in which a multiplex frame with a head part and a functional part are described, and in which frame synchronization has been established, characterized by the fact that at least one known word, located in a known place in the head part (SOH) of the frame, is compared with a reference word, and information about the transmission error probability is derived from the comparison. The present invention is also a device to detect transmission errors in a multiplex signal, which has a multiplex structure according to CCITT Recommendations G.707, G.708 and G.709, in which a multiplex frame with a head part and a functional part are described, and which contains a synchronization circuit for synchronizing the multiplex frame with the device, characterized by the fact that it contains means (UE, UE1, UE2) for comparing at least one word (A1, A2), located in a specific place in the head part (SOH) of the frame, with a reference word, and which contains means (AE) that derive information about the transmission error probability from the comparison, and supply it to an outlet (FL).

Advantageous configurations can be found in the subclaims.

A special advantage of the invention is that the reduced number of elements not only produces cost advantages, but that the total requirement of energy is considerably reduced, which is of special advantage e.g. when the circuit is contained in intermediate regenerators, which must be operated with their own energy supply.

BRIEF DESCRIPTION OF THE DRAWINGS

The following describes configuration examples via FIGS. 1-7:

FIG. 1 shows a regenerator unit according to the invention, in block circuit diagram form.

FIG. 2 shows the head part of an STM-1 signal.

FIG. 3 shows a first configuration example of a transmission error detection according to the invention.

FIG. 4 shows a second configuration example of a transmission error detection according to the invention.

BEST MODE FOR CARRYING OUT THE INVENTION

Figure 5:
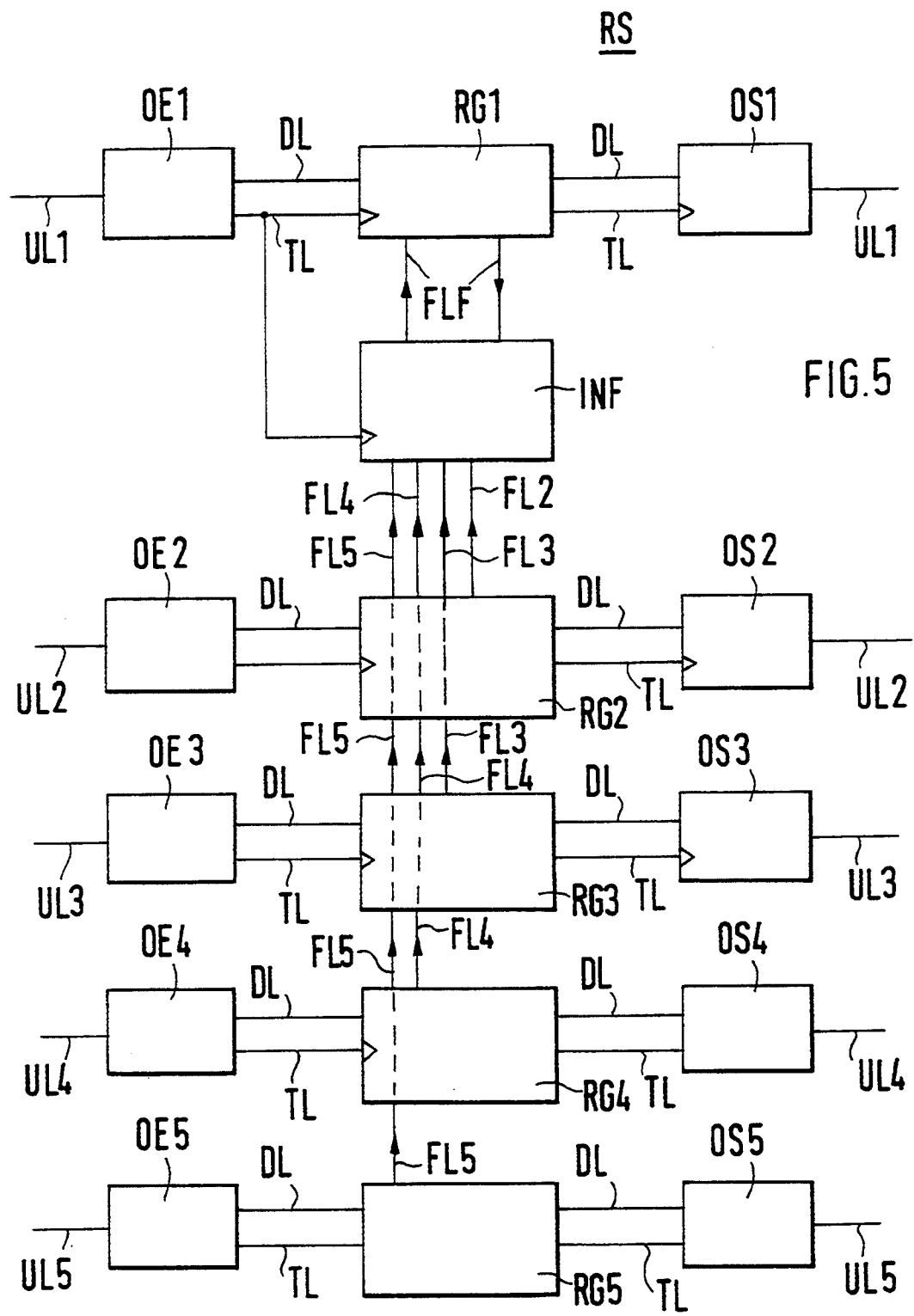
FIG. 5 shows the essential parts of a regenerator station for several transmission lines, according to the invention.

FIG. 1 shows a regenerator unit RE according to the invention, in the form of a schematic block circuit diagram. It only exhibits the essential components of the invention. A receiver OE, for receiving optical signals, is connected on the receiving side to a beam wave guide, as transmission line UL. The transmission line UL transmits multiplex signals, which exhibit a multiplex structure according to CCITT-Recommendations G.707, G.708 and G.709, and in which a frame with a head part and a functional part are described. To simplify the description, the following starts with the transmission of STM-4 signals, although the advantage of the invention for the transmission of higher multiplex signals, e.g. STM-16 signals, is more significant.

The receiver OE contains an optical-electrical converter, and subsequently a circuit for timing and synchronizing the receiver OE with the frame, and therefore an outlet for a timing line TL and an outlet for a data line DL, in which the STM signals are transmitted in series. The timing line TL and the data line DL are connected to a regenerator RG and the transmission error detection UE. In turn, the regenerator RG is connected by data line DL and timing line TL to a transmitter OS. The transmitter OS contains and electrical-optical converter and an outlet for a beam wave guide as the transmission line UL. The transmission error detection UE may also be connected between regenerator RG and transmitter OS by data line DL and timing line TL. The regenerator RG may also contain the timing and synchronizing circuit.

Regeneration of the bit flow with regard to pulse wave shape, time and amplitude takes place in well known form in regenerator RG, without the need to decompose the STM-4 signal. Regeneration of the bit flow, as such, is not the subject of this invention, and is therefore not detailed any further.

Determination of the transmission error probability is functionally separated from the regeneration of the bit flow, in a transmission error detection UE, which is especially designed for this purpose. However, regenerator RG and the transmission error detection UE may be located in one unit.

To determine the transmission error probability, this invention requires knowing the content and position of at least one word in the head part of the STM-4 signal. This known word can also be retrieved as a reference word in the transmission error detection UE, and is then compared with the reference word. The transmission error probability can then be derived from the results of the comparison.

FIG. 2 shows the head part SOH of an STM signal. To simplify the representation, the head part SOH of an STM-1 signal is shown, which in principle also corresponds to the head part of an STM-4 signal. For example, the frame identification word is defined in the first line, and is used to synchronize the frame beginning of the STM signal.

The word consists of three synchronization bytes A1 and three synchronization bytes A2. The bit sequence is always 11110110 for A1 and 00101000 for A2. This means that the frame identification word, or only parts of it, are suitable for use in determining the transmission error probability.

A first configuration example of a transmission error detection UE1 is shown in FIG. 3. In the simplest case, it shows a shift register SR, to which the bit flow in data line DL is transmitted and timed by timing line TL. Through a parallel outlet in parallel line PL1, the shift register SR is connected to the reference word decoder RWD, in which the bit flow in the shift register SR is compared with a reference word stored in the reference word decoder RWD. The reference word decoder RWD determines the result of the comparison by the number of coinciding bits per word, or the number of noncoinciding bits per word, and transmits the result to an evaluation unit AE. In the simplest case, the reference word consists of one byte, i.e. 8 bits, but other word lengths may also be submitted.

A second configuration of a transmission error detection UE2 is shown in FIG. 4. It has a first shift register SR1 and a second shift register SR2, both of which are connected to data line DL and timing line TL, where the bit flow going to shift register SR1 is delayed by a time-delay device VG in data line DL, before shift register SR1. Shift register SR1 is connected by a parallel outlet of parallel line PL2 with shift register SR2, in such a way, that any conditions existing in the shift registers can be compared with each other. Shift register SR2 is expanded by a decoder, which transmits the result of the comparison to an evaluation unit AE.

By contrast to the first, the second configuration of transmission error detection UE2 has no stored reference word. This type of transmission error detection presupposes that the head part SOH contains two words with equal bit sequence, where the bit sequence, as such, need not be known by transmission error detection UE2. Fortunately the two words are directly behind each other in the bit flow. In this instance the time-delay device VG causes a one-word delay in the bit flow, which allows both words to be compared in shift registers SR1 and SR2. If both words are farther apart, the bit flow must be delayed in the time-delay device VG by the length of the word and the distance between the words. As in the first configuration, the selected word length is a byte with 8 bits.

The evaluation unit AE is equally designed and suited for both configurations of transmission error detections UE1 and UE2. The evaluation unit AE is timed by timing line TL, and is therefore in a position to determine an error rate by means of the number of reported coincidences or noncoincidences, the number of errors per frame, or the number of errors with regard to some other reference magnitude, as information about the transmission error probability, and to report this result to a central unit as an error message via error line FL. The result may also consist in only reporting to the central unit whether or not a specified value of the transmission error probability has been exceeded, i.e. it has only been determined whether or not a problem exists. In that instance, the result would be a trouble message.

The evaluation unit AE must not necessarily be located in the regeneration unit RE. It may also be located in the interface described below, or in regenerator RG1 described below, or in another unit.

When determining transmission errors in the STM-N signals, it is of advantage to determine the errors per frame, and transmit them within the frame time to central unit Z. STM-N signals have a frame length of 125 ms, which translates into an error transmission rate of only 8 kHz. With extensive error messages, it may be of advantage to transmit them as n=2, 3, . . . for each nth frame, which would result in a corresponding reduction of the transmission rate.

The position in the STM-N module of the words to be compared is known to the evaluation unit AE. It only evaluates comparison results in regard to these words, to determine the transmission errors.

In addition to the derived bit time, the timing line TL also contains the byte time and the frame time. Depending on their configuration, the elements of the regeneration unit RE only evaluate the time impulse(s) they require. Thus, the bit time is required for the time-delay device VG and shift registers SR, SR1 and SR2, however the evaluation unit AE requires the frame time and, depending on the technical configuration, the bit time or byte time. The position of the words to be compared can also be fundamentally determined by the shift registers. In that case, only the relevant comparison results are transmitted to the evaluation unit AE.

FIG. 5 shows a configuration example of a regeneration station RS with five transmission lines UL1 to UL5. Each transmission line UL1 to UL5 is equipped with a receiver OE1 to OE5, a regenerator RG1 to RG5 and a transmitter SE1 to SE5. In the illustrated regenerators RG2 to RG5, the pertinent transmission error detections UE are not shown separately, but only as pertaining to regenerators RG2 to RG5 by their error lines FL2 to FL5. The operating mode of regenerators RG2 to RG5 was already described in the configuration example of FIG. 1.

Regenerator RG1 represents a known regenerator, which complies with CCITT-Recommendation G.958, i.e. it contains a demultiplexer followed by a multiplexer, and between them a circuit for inserting bits into the parity byte B1, in case STM-4 signals or signals of a higher multiplication step are transmitted, so that the transmission error probability can be detected by parity determination. This means that bits can be inserted into the head part SOH of regenerator RG1.

Furthermore, the service channel in regenerator RG1 can also be used, which means that byte F1, or others intended for national use for example, or still unfilled bytes, can be used.

Thus, regenerator RG1 is able to transmit "inband" the transmission error probability, which was determined by regenerators RG2 to RG5, to the head part of an STM-4 signal. To that effect, error lines FL2 to FL5 are connected to an interface INF, through which the transmission error probability is inserted into service channel F1 by error line FLF.

The insertion then conforms to the CCITT-Recommendations, and is known as such.

Interface INF is timed by a timing line TL, which is connected to receiver OE1. Special synchronization between regenerators RG2 to RG5 and interface INF is not required, because transmission through the error line takes place at a transmission rate of only 8 kHz, or a fraction thereof. Interface INF compiles the transmission error probability in the individual regenerators RG2 to RG5 in specific form, so that central unit Z can determine which transmission error probability belongs to what regenerator section. To that effect, the error signal inserted into service channel F1 may contain a code for the regenerator section and a number to identify the transmission line UL2 to UL5. The error signals in error lines FLF can be transmitted in series as block error numbers.

Figure 6:
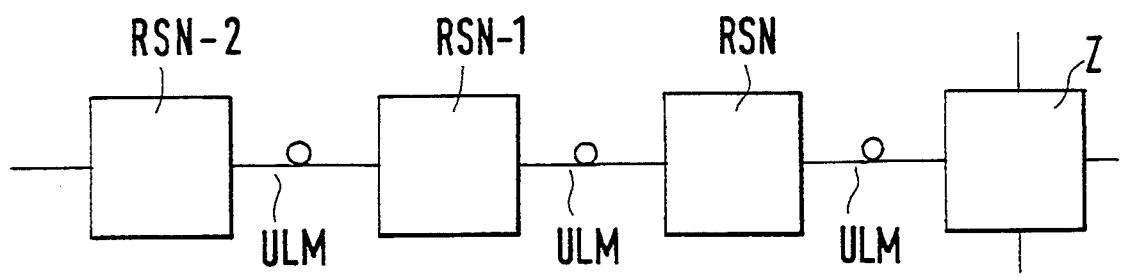
FIG. 6 shows a section of a first transmission segment with several regenerator sections.

FIG. 6 depicts the last three regenerator stations RSN-1, RSN-2 and RSN representing all regenerator stations of one transmission segment and central unit Z. Transmission lines ULM connect the regenerator stations RSN . . . to each other and to central unit Z. Such a transmission segment may have up to 50 regenerator stations RS, where the sections between the regenerator stations RSN represent regenerator sections that are individually controlled for transmission error monitoring of each transmission line UL.

If a problem or interruption of a transmission line occurs, the transmission error probability determined in each regenerator unit RE in central unit Z can indicate the regenerator section in which the problem or interruption occurred. By contrast to regenerators RG1, which comply with CCITT-Recommendation G.958 by transmission error monitoring, in which the B1-byte always determines the transmission error probability between two regenerator stations, the regenerator unit RE according to the invention determines the transmission error probability with respect to only one data source, thus it increases from regenerator station to regenerator station. In this case, when transmitting problem messages, the threshold from regenerator station to regenerator station must be increased. To limit this absolute transmission error probability, in one configuration example, the word or words used to determine the transmission error probability are regenerated in each fifth regenerator unit that complies with CCITT-Recommendation G.958. To that effect, the regenerator unit RG1, which complies with CCITT-Recommendation, G.958, is cyclically interchanged in each following regenerator unit RS with the regenerator units RG2 to RG5 of the invention, so that each transmission line ULN, N=1, 2, 3, 4, 5 contains a sequence of four regenerator units according to the invention, and which comply with CCITT-Recommendation G.958. Of course, the relationship between regenerator units complying with CCITT-Recommendation G.958, and the regenerator units according to the invention, can be varied as needed for each transmission line ULN. The number 5 used as the number of transmission lines only represents an example, it may be larger or smaller.

Figure 7:
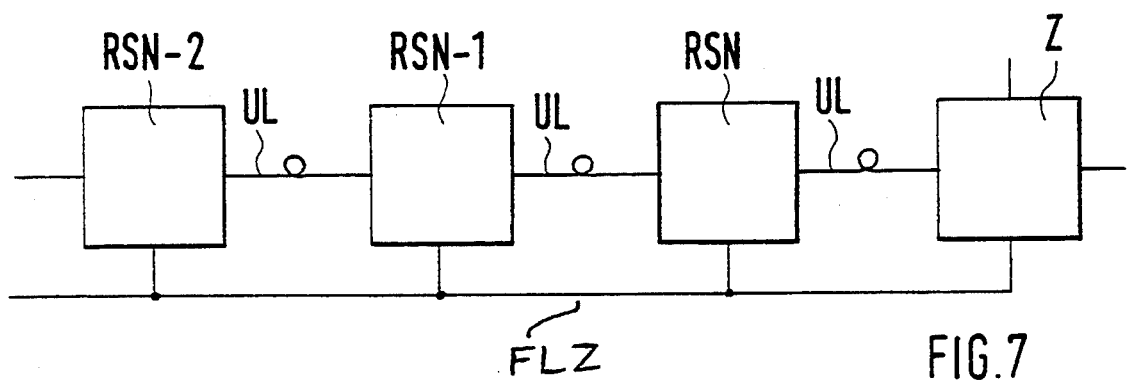
FIG. 7 shows a cutout of a second transmission segment with several regenerator sections.

FIG. 7 depicts a transmission segment, in which error line FL is not connected to central unit Z by an STM-4 signal, but by an additional external line FLZ. This configuration suggests itself when only regenerators RG according to the invention are located in the regenerator stations RSN, or the "inband" transmission is not advantageous for other reasons.

A network junction point, an end point or even a network manager provided for the synchronous digital transmission, may represent a central unit Z. In the case of the configuration example in FIG. 7, any desired device could be viewed as a central unit Z which is capable of describing the inband and which can insert the transmission error probability into the head part of an STM-N signal.

The configuration examples refer to optical transmission systems. Selecting other transmitters or receivers makes it possible to use the invention also for radio or electrical line transmission.

By contrast to known regenerators that comply with CCITT-Recommendation G.958, the advantage of the regenerators RG of the invention is in the lack of subassemblies such as the multiplexer, demultiplexer or the subassembly for determining parity, and the subassembly required to insert the parity into the head part of an STM-N signal. In that connection, the regenerators RG of the invention require considerably less energy, which reduces their cooling cost. The low energy requirement has special meaning for optical transmission sections, for example when these are installed in unpopulated areas, and the regenerator stations RS must be supplied with locally produced current, e.g. by solar cells.

The configuration examples only refer to the transmission of data in one direction. For two-directional transmission, each of the regenerator stations RS have two regenerator units RE, one for transmission in one direction, and the other for transmission in the opposite direction. The regenerator station RS for transmitting in one direction can only contain regenerator units RE according to the invention, whose error lines FL are connected to a regenerator unit for the opposite direction, which complies with CCITT-Recommendation G.958, through an interface for inband transmission.

We claim:

1. A process to determine transmission errors in a multiplex signal for a Synchronous Digital Hierarchy (SDH) signal, structured according to CCITT-Recommendations G.707, G.708 and G.709, in which a multiplex frame with a head part and a functional part are described, and in which frame synchronization has been established in a receiving device, comprising the steps of:

retrieving at least one known word located in a known place in the head part of the frame to be checked for transmission errors; and comparing all bits of said at least one known word with at least one reference word having a predetermined value based on said at least one known word so that no computation is necessary to determine said at least one reference word so as to derive information about a transmission error from the comparison.

2. A process according to claim 1, characterized by the fact that the head part (SOH) contains at least two known words (A1, A2), located in known places, and at least one of these words is used as the reference word.

3. A process according to claim 1, characterized by the fact that the reference word is entered into a reference word decoder (RWD), where it is compared with at least one known word located in a known place in the head part (SOH).

4. A process according to claim 1, characterized by the fact that a synchronization word (A1, A2), or parts thereof, is used as the known word, located in a known place in the head part (SOH).

5. A process according to claim 1, characterized by the fact that:

it is used to monitor a regenerator section of a transmission segment, the information about the transmission error is supplied to a transmission unit (RG1), which, according to CCITT-Recommendations, is able to insert the information about the transmission error into a specified place (F1) in the head part (SOH), and the information about the transmission error is transferred to a central unit (Z), where it is rerouted or evaluated.

6. A device to detect transmission errors in a multiplex signal, which has a multiplex structure for a Synchronous Digital Hierarchy (SDH) signal according to CCITT-Recommendations G.707, G.708 and G.709, in which a multiplex frame with a head part and a functional part are described, and which contains a synchronization circuit for synchronizing the multiplex frame with the device, comprising:

means for retrieving at least one known word located in a known place in the head place in the head part (SOH) of the frame to be checked for transmission errors;

means (UE, UE1, UE2) for comparing all bits of said at least one known word (A1, A2) with at least one reference word having a predetermined value based on said at least one known word so that no computation is necessary to determine said at least one reference word; and means (AE) for deriving information about a transmission error from the comparison, and for supplying it to an outlet (FL).

7. A device for monitoring a regenerator section of a transmission segment, with a device according to claim 6, characterized by the fact that, in order to derive the information about the transmission error, the means (UE, UE1, UE2) are connected to a transmission unit (RG1), which, according to the CCITT-Recommendations, is able to insert the information about the transmission error into a specific place (F1) in the head part (SOH).

8. A device according to claim 7, characterized by the fact that several regenerator installations (RE) according to claim 1 are assembled to a regenerator station (RS) containing at least one regenerator installation (RG1) that complies with CCITT-Recommendation G.958, and that the error lines (FL) are connected, through an interface (INF), to a regenerator installation (RG1) that complies with CCITT-Recommendation G.958.

9. A device according to claim 8, characterized by the fact that, in order to evaluate the information about the transmission error (F1) inserted into the head part (SOH) of the multiplex frame, it is connected to a central unit (Z), in which the information about the transmission error is evaluated or rerouted.

10. A device according to claim 6, characterized by the fact that the outlet is connected to a central unit (Z), in which the information about the transmission error is evaluated or rerouted.

11. A device according to claim 6, characterized by the fact that the transmission error detection (UE, UE1, UE2) is integrated into the synchronization circuit for synchronizing the multiplex frame.

12. A device according to claim 7, characterized by the fact that, in order to evaluate the information about the transmission error (F1) inserted into the head part (SOH) of the multiplex frame, it is connected to a central unit (Z), in which the information about the transmission error is evaluated or rerouted.

13. A regenerator unit (RE), comprising:

an optical receiver (OE), responsive to multiplex optical signals (UL) structured in a Synchronous Digital Hierarchy (SDH) according to CCITT-Recommendations G.707, G.708 and G.709 having a head part and a functional part, for providing received multiplex optical signals (DL, TL);

a regenerator (RG), responsive to the received multiplex optical signals (DL, TL), for providing regenerated multiplex optical signals;

an optical transmitter (OS), responsive to the regenerated multiplex optical signals, for providing transmitted regenerated multiplex optical signals; and transmission error detector means (UE1, UE2), responsive to the received multiplex optical signals (DL, TL), for comparing all bits of a known word of data from the head part of the received multiplex optical signals (DL, TL) with a reference word having a predetermined value based on the known word, for providing transmission error detector signals (FL), whereby no computation is necessary to determine the reference word.

14. A regenerator unit (RE) according to claim 13, wherein said transmission error detector means (UE1, UE2) includes a transmission error detector (UE1), comprising:

a shift register (SR), responsive to data line signals (DL) and timing line signals (TL) in the received multiplex optical signals (DL, TL), for providing parallel data signals (PL1), which are the known word from the head part of the received multiplex optical signals (DL, TL);

a reference word decoder (A1), responsive to the parallel data signals (PL1), for comparing all bits of the known word with a stored reference word having a predetermined value based on the known word, for providing reference word decoder signals indicating the number of coinciding bits between the known word and the stored reference word; and an evaluating unit (AE), responsive to the reference word decoder signals, and further responsive to the timing line signals (TL), for providing the transmission error detector signals (FL).

15. A regenerator unit (RE) according to claim 14, wherein said transmission error detector means (UE1, UE2) includes a transmission error detector (UE2), comprising:

a time delay circuit (VG), responsive to data line signals (DL) and timing line signals (TL) in the received multiplex optical signals (DL, TL), for providing time delayed signals;

a first shift register (SR1), responsive to the time delayed signals, and further responsive to the timing line signals (TL), for providing parallel data signals (PL1) which are a first known word from the head part of the received multiplex optical signals (DL, TL);

a second shift register (SR2), responsive to the data line signals (DL), and further responsive to the timing line signals (TL), and further responsive to the parallel data signals (PL1), for comparing all bits of the first known word with a second known word from the head part of the received multiplex optical signals (DL, TL), the second known word having a predetermined bit pattern based on the first known word, for providing second slide register signals indicating the number of coinciding bits between the first known word and the second known word in the received multiplex optical signals (DL, TL); and an evaluating unit (AE), responsive to the reference word decoder signals, and further responsive to the timing line signals (TL), for providing the transmission error detector signals (FL).

16. A regenerator unit (RE) according to claim 13, wherein said transmission error detector (UE) is coupled between said regenerator (RG) and said optical transmitter (OS), and is responsive to the regenerated multiplex optical signals.

17. A regenerator unit (RE) according to claim 13, wherein said transmission error detector (UE) and said regenerator (RG) are located in a single unit.

* * * * *